United States Patent [19]

Dimon

[11] 4,327,555
[45] May 4, 1982

[54] SOLAR AIR CONDITIONING SYSTEM

[76] Inventor: Donald F. Dimon, P.O. Box 15607, Fort Lauderdale, Fla. 33318

[21] Appl. No.: 74,011

[22] Filed: Sep. 10, 1979

[51] Int. Cl.³ ............................................. F25B 15/00
[52] U.S. Cl. .................................... 62/485; 62/235.1; 62/260; 165/64; 165/40; 165/45; 166/302
[58] Field of Search ............. 62/2, 238 B, 476, 324 B, 62/238.3, 485, 260, 235.1; 165/62, 63, 64, 40; 166/302

[56] References Cited

U.S. PATENT DOCUMENTS 2,272,871  2/1942  McGrath ......................... 62/238 B
4,178,989  12/1979 Takeshita et al. ...................... 62/2

Primary Examiner—Albert J. Makay
Assistant Examiner—Henry Bennett
Attorney, Agent, or Firm—Charles H. Lindrooth

[57] ABSTRACT

An absorption type air conditioning system in which a solar collector is used integrally to heat and strip refrigerant from the mixture of absorbent and refrigerant to eliminate a separated hot water or other heat transfer medium cycle as normally employed between the solar collector and the stripper generator.

Also, the present invention includes an absorber which is integrally located within the confines of a deep water well used to extract heat from the entire system, together with a condenser coil or tube also located within the deep water well. The integral location of absorber and condenser within the confines of the heat sinking medium, such as a deep water well raises the overall cooling efficiency since a separated cooling cycle and heat exchanger are eliminated.

The invention is particularly suited to brine type absorption systems, such as lithium bromide and water solutions where stripper generator action may take place at temperatures easily obtainable with the solar collector process included.

The invention is also suited to ammonia water systems, providing a highly efficient heat removal process with the energy required supplied by solar means.

The system uses a minimum amount of electrical energy. The electrical energy is used primarily for pumping and control purposes, as well as operation of a fan for circulation of air. The conventional compressor used in freon systems is eliminated together with the major requirement of electrical energy in such prior art systems.

9 Claims, 5 Drawing Figures

SOLAR AIR CONDITIONING SYSTEM

BACKGROUND OF THE INVENTION

This invention relates to absorption type air conditioning systems, and more particularly to a novel and useful integral water well, solar powered absorption type air conditioning system. Prior art absorption type air conditioning and refrigeration systems include external means to produce cooling from a supply of water or moving air; and, solar types of such systems include a separate hot water system energized by a closed loop hot water cycle heated by solar energy. The present invention includes a novel design and structure to integrally develop heating and cooling without external cycles. The elimination of the external heating cycle and external cooling cycles, provides air conditioning and refrigeration at higher efficiency and at a lower cost of initial installation.

The absorption principle used in this invention includes a stripper-generator in which a mixture of refrigerant and absorbent has heat energy applied thereto and the refrigerant is expelled as a vapor from the mixed solution introduced into the stripper-generator. The expelled vaporized refrigerant is then condensed by a heat exchanger which removes the heat of vaporization, reducing the vapor to liquid refrigerant. The cooled, liquid refrigerant is then appplied to an evaporator which provides the temperature drop for air conditioning purposes by removing heat from air or water or other medium used for air conditioning or refrigeration purposes, and converting that heat into heat of vaporization of the refrigerant. The absorbent is cooled and combined with the vaporized refrigerant in an absorber and cooled by external air or water used for heat extraction from the system. The heat applied to the stripper-generator along with the heat removed from the air conditioning or refrigeration use is removed by the external air or liquid medium.

Although there is a similar process included in the present invention, the process differs by being integral to the included elements. In this invention, the stripper-generator is preferably located at the solar collector, such that solar heat is applied directly to a flat vessel containing the mixture of refrigerant and absorbent. By such direct application, a separate hot water cycle is avoided and the attendant loss of thermal efficiency due to such separated water cycle is avoided. Further, and as preferable with the present invention, the overall heat removal process is accomplished by location of the refrigerant condenser operation and the absorber at and within a deep water well, used for high efficiency heat removal from the system. This provides a lowered temperature of liquid refrigerant to be applied to the evaporator, raising the system efficiency. The water well is provided with a thermal sensor such that water may be withdrawn and expelled from the well, in the event that the water temperature at the top of the well exceeds a predetermined temperature. This automatic feature insures that the temperature of the liquid refrigerant will be less than a predetermined value when applied to the evaporator for refrigeration or air conditioning purposes, precluding excessive water flow without automatic control.

SUMMARY OF THE INVENTION

As further described herein, air conditioning or refrigeration may be produced by evaporation of a liquid refrigerant, converting the heat removed into heat of vaporization of the evaporated refrigerant. A closed cycle is developed by absorption of vaporized refrigerant into a mixed solution of refrigerant and absorbent, and then stripping the refrigerant and absorbent by application of an external source of heat. The overall heat from both vaporization and stripping processes is removed by an external coolant medium. In the present invention, the absorption process is preferably accomplished at the bottom of a deep water well, as is the condensation of the stripped refrigerant vapor. Also in the present invention, the stripper-generator is preferably located within a solar collector. The integral system greatly reduces installation cost by removing components and material required, and provides more efficient thermal conversion over prior art absorption type cooling systems.

A BRIEF DESCRIPTION OF THE DRAWINGS

SOME OBJECTS AND ADVANTAGES OF THE PRESENT INVENTION

One object of the invention is to provide a highly efficient, low cost solar powered air conditioning or refrigeration system.

One other object of the invention is to provide cooling and condensation integrally within a deep water well, to eliminate a separate heat exchanger or condenser, and its attendant separate cycle for cooling purposes.

Another object of the invention is to provide an integral solar collector, stripper-generator to provide direct solar energy to an air conditioning or refrigeration system without need for a separate hot water or other medium for a heating cycle.

A further object and advantage of the invention is the elimination of heat exchanger equipment, usually required outside of an air conditioning installation; said cooling being provided underground in a water well. The removal of such equipment causing lower cost of installation, lower cost of operation, lower cost of maintenance, higher efficiency of energy utilized, and promotes easier and more flexible architectural designs for the overall building and cooling system.

A still further object and advantage of the invention is to utilize the lowest possible temperature available for the operation of an evaporator, such that the evaporator may enjoy the highest possible efficiency of operation, said low temperature being found and utilized by this invention as the water temperature at the bottom of a deep well, lake, canal or other body or stream of coolant medium.

Another still further object of the invention is the reduction and near elimination of electrical energy to operate an air conditioning or refrigeration system.

Still further and other objects and advantages of the invention may be seen in the description of preferred embodiments hereof, together with reference to the included appended drawings.

DESCRIPTION OF A PREFERRED EMBODIMENT

Figure 1:
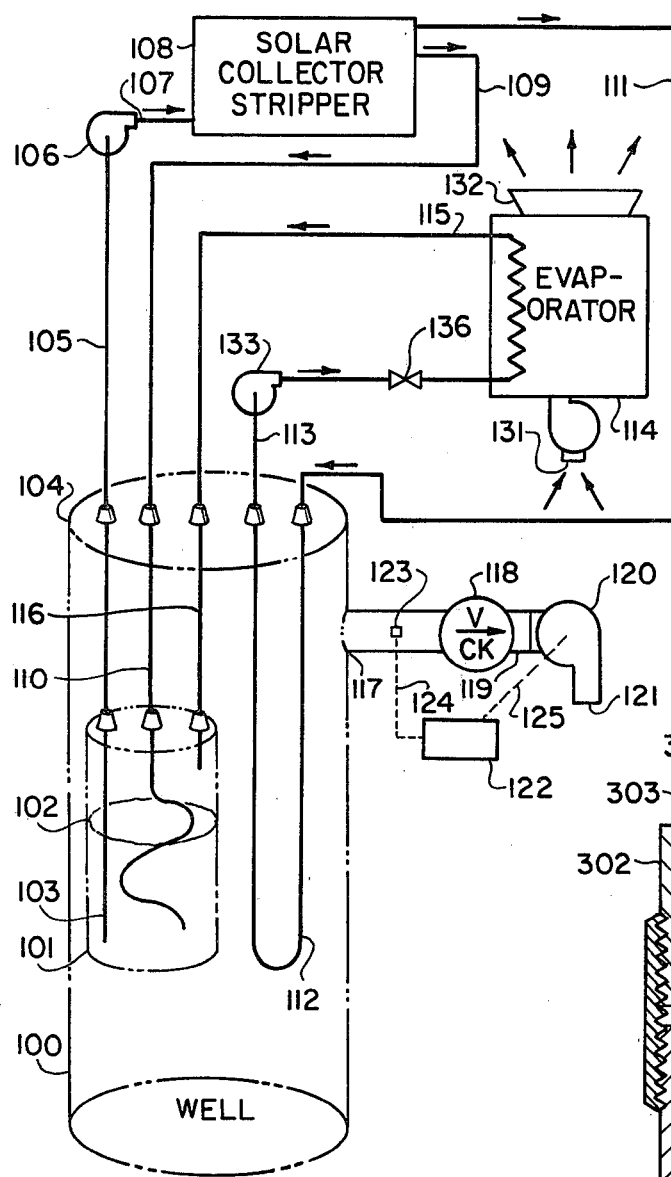
FIG. 1 illustrates the overall absorption type air conditioning system of the present invention.

A preferred embodiment of the present invention is shown diagrammatically in FIG. 1. The illustration does not represent any actual scale, but is shown to teach the invention, describe the operation, and to enable one skilled in the arts to build and use the invention accordingly.

In FIG. 1, a deep water well is shown in which the casing is denoted by (100). The well is sealed and filled with water, drawn by well pump (120). A check valve (118) holds the water seal when the pump is not running. A thermal sensor (123) is connected by means (124) to a controller (122), such that in the event the temperature of the well water at the sensor location (123) exceeds a predetermined value, set within the pump controller (122), the well pump is turned on, expelling the heated water at (121). Cool water then enters from the bottom of the well to replace the expelled water. The expelled water may of course be used for other purposes, such as ordinarily provided by well water. The operation of the thermal sensor, preferably located at the top of the well (123) and controller (122) and pump (121) insures a supply of coolant throughout the well at a temperature determined by presetting the controller (122). The controller (122) is wired (125) to the pump (120). The discharge pipe (121) is connected to drain or otherwise use the expelled heated water.

Also, in FIG. 1, within the well are found the absorber tank (101), the mixture of absorbent and refrigerant (102) in said tank, and tube (103) in which the mixture (102) is drawn from the absorber (101), through tube (105) by the pump (106). The mixture is then forced through tube (107) into the solar collector (108) which provides the function of stripper-generator. In the solar collector (108), the mixture of refrigerant and absorbent is separated by the action of heat, into vaporized refrigerant at (111) and absorbent at (109). It is understood that the stripper-generator process may not be complete, and that the tube (109) may contain some refrigerant, but at a reduced concentration than that at tube (107). The purpose of the stripper-generator at solar collector (108) is to provide a source of refrigerant, and to provide a closed continuous cycle of operation. The absorbent at (109) is then returned to the absorber (101) in the well, through tube (110). The vaporized refrigerant at (111) is condensed by a "U" shaped tube (112) also located within the deep water well. The "U" shaped tube (112), being in contact with the water coolant in the deep water well, provides condensation and cooling of the refrigerant at tube (113), where it is introduced into the evaporator (114). The refrigerant is evaporated into vapor form at (115), converting the heat extracted from the air introduced by blower (131) and expelled as cool air at (132) into heat of vaporization of the refrigerant. The vaporized refrigerant is expelled at (115), and by tube (116) is introduced back into the absorber (101), which completes the overall cycle. A small pump (133) is used to supply the evaporator with refrigerant, where additional pressure is required by the evaporator.

In FIG. 1, the heat applied at the stripper-generator, solar collector (108) together with heat removed from the air at blower (131) is all removed by the cooling process of the water well. The heated water being expelled at (121). As a rough estimate of thermal efficiency, this invention provides approximately 1 BTU of cooling for approximately 2 or 2½ BUT's of heat extracted at the well pump (121). The temperature at the evaporator is generally approximately 50° F., such that the dew point of moist, highly humid air entering through the blower (131) will cause condensation of water out of the entering air, and thereby reduce the humidity as well as temperature of the expelled air at (132). The condensed water is not shown in FIG. 1, since it is not part of the closed cycle refrigerant-air conditioning shown. This water may be drained by conventional means well known in the arts. Two separate cooling processes are accomplished in the deep well, by the integral design of the present invention. The vaporized refrigerant is condensed in "U" tube (112); and, the heat of vaporization of the vaporized refrigerant at tube (116) is removed, together with any heat of absorption (103). Both the condenser (112) and absorber (101) are integrally located within the water well, eliminating numerous components and materials of prior art systems. It is also seen, that the integral location of condenser and absorber within the well, eliminates the need for a separate set of heat exchangers and related components to extract heat from the system. The elimination of such separate external cooling cycles provides cooling at the lowest possible temperature, that of the well water within the well, before it is drawn and heated by incidental exposure to environmental temperatures at attendant pipes, tanks, condensers, etc. The integral solar collector, stripper-generator (108) also eliminates a separate external hot water or other medium to apply heat to the system. This also improves the efficiency over prior art systems by removing the cause of thermal temperature drops in applying the heated water or other medium to the stripper-generator through attendant pipes, heat exchangers, etc.

Figure 2:
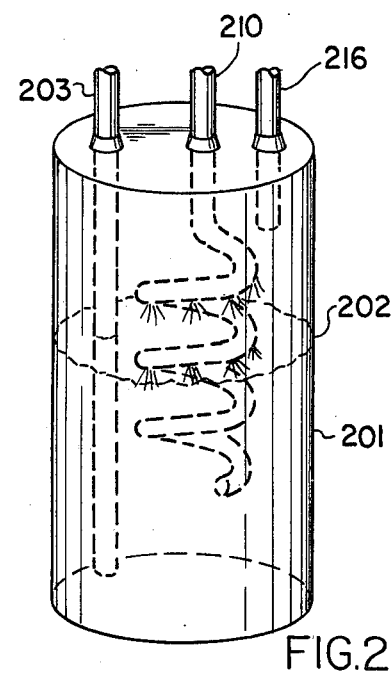
FIG. 2 illustrates a water well absorber used in this invention, in greater detail. This may apply to a lake or canal installation correspondingly.

For a clear understanding of the absorber principle, a separate diagram is shown in FIG. 2. FIG. 2 is not drawn to any scale, but is useful to teach the operation of the invention; nor is FIG. 2 to be limiting on the design of the absorber, since absorbers are well known in the art. The shape of the absorber is limited only, when it is to be located within a deep water well, which is usually of a narrow guage along the vertical geometry. In FIG. 2, a long and narrow tank (201) encloses the mixture of refrigerant and absorbent, shown at the liquid line at (202). A tube (203) withdraws mixture, a tube (210) supplies absorbent, and, a tube (216) supplies vaporized refrigerant. Cooling takes place by the whole structure, tank and associated tubes within the confines of the water well. Other details of the absorber, depend upon the refrigerant employed and the absorbent employed, as well as temperatures, pressures, etc., all of which is documented in the arts. In a brine water embodiment hereof, after the system is charged with for example, lithium bromide, a vacuum is drawn to at least 0.2 inch hg abs., depending upon the actual temperatures employed, very low pressure being necessary for correct evaporation and absorption at low temperatures, in brine type embodiments.

Figure 3:
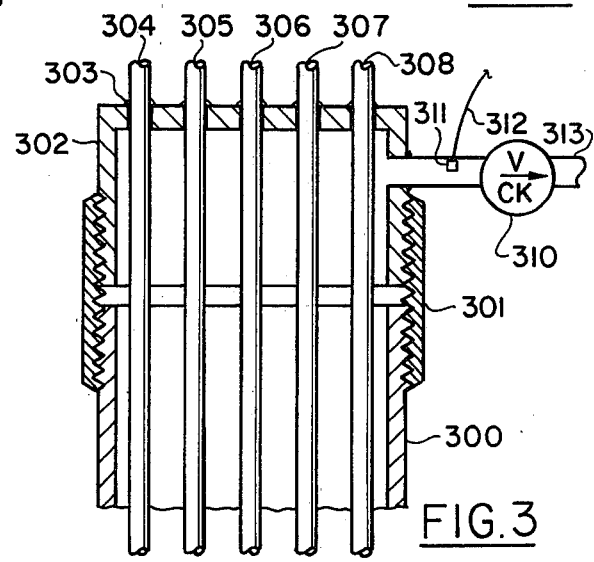
FIG. 3 illustrates a preferred method of sealing a well head to prevent loss of suction of the water well, and the location of a thermal sensor.

A preferred method of sealing the well head is shown in FIG. 3. In FIG. 3, a union is employed to connect the casing (300) to the well head (302). The union (301) threads to both casing and well head. The well head (302) is preferably copper such that copper tubes may be soldered at (303) for example. The tubes (304), (305), (306), (307), and (308) are all soldered to the well head. The water extraction tube or pipe (311) is also soldered to the well head. A plug (312) is used to insert the thermal sensor (311). A check valve (310) and discharge pipe (313) are connected to expel heated water. The solder seal at (303) for example keeps the well water tight. Other methods of sealing may be employed, such as plugs inserted between pipes or tubes and holes in the well head; or, integral designs, factory made, may be used of course. No seal is required for lakes, canals or open wells.

Figure 4:
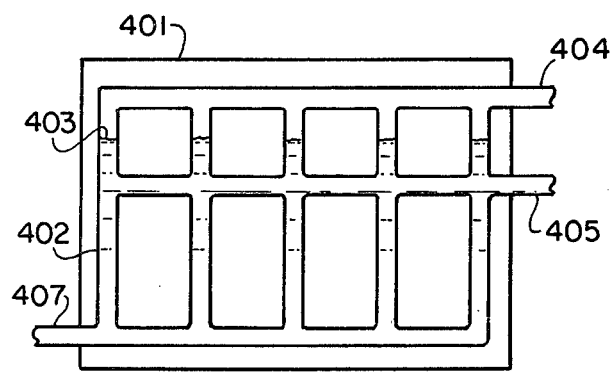
FIG. 4 illustrates a flat type solar collector, stripper-generator useful with the invention, preferable with integral embodiments hereof.

FIG. 4, illustrates a preferred solar powered stripper-generator for use with the invention. In FIG. 4, a frame, 401, which includes a metallic sheet painted with a black thermal paint, is joined to a network of tubing, (402), also painted black. The tubing network provides for a liquid vapor line at (403), such that vaporized refrigerant (404) may be expelled, as well as liquid absorbent (405). The mixture of absorbent and refrigerant is introduced at (407). The whole collector is not laid flat, but either vertical or partially vertical, such that the liquid line (403) may be employed for separation purposes. Solar energy falling upon the assembly, strips the refrigerant and absorbent, generating vaporized refrigerant at (404) and concentrated absorbent at (405). A glass or plastic translucent sheet is applied over the assembly to prevent convection thermal loss. The solar collector shown in FIG. 4, is not limiting upon the invention, as the design of thermally efficient collectors is well known in the art. However, in this invention provision must be included for separation of refrigerant and absorbent. The collector shown in FIG. 4, is particularly suitable for use with lower temperature systems, such as water refrigerant and lithium bromide absorbent. In collectors which employ concentrators, such as parabolic reflectors, other types of higher temperature refrigerants and absorbents may be practically employed.

The invention may be used when solar energy is not available by a separate stripper generator operated by any convenient form of heat energy. In this application of the invention, automatic valves are included to switch the vapor, absorbent, and mixture tubes from the solar collector, stripper-generator, to an added stripper-generator, which may be operated at times when no solar power is available.

Thermal storage may be incorporated with this invention in three possible basic forms. One form uses stored heated water applied to a hot water type stripper-generator instead of the solar collector shown in FIG. 1. Another form uses ice or cold water storage, by including a heat exchanger at the evaporator to produce ice or chilled water, instead of chilled air. A third form takes the chilled air as produced at (132) in FIG. 1, and passes it over a rock pile which chills the rocks and provides a storage effect, since time is required to reheat the chilled rocks by natural convection and conduction heating.

Figure 5:
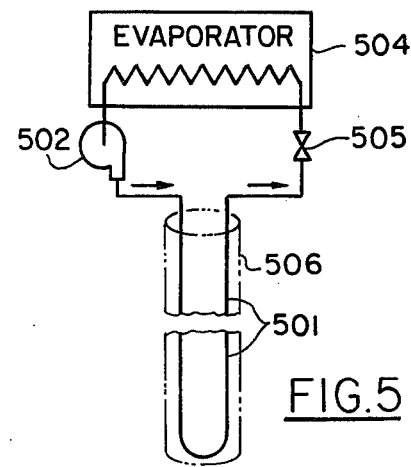
FIG. 5 illustrates the invention used with a compression type of refrigeration-air conditioning system.

The basic invention includes the integral water well cooling principle as shown and described herein. Without departing from that spirit and scope, another embodiment is shown in FIG. 5, employing compression type refrigeration. In this type of embodiment, the absorber is removed, and only the "U" tube remains for condensing the refrigerant from a super heated vapor to a sub-cooled liquid.

In FIG. 5, the "U" tube (501) is used to condense vaporized refrigerant into a cool liquid at valve (505). The "U" tube (501) is located within the water well (506). The sealing of the well, the operation of the thermally controlled water well pump, and the efficiency of cooling are as shown for the absorption type embodiment of FIG. 1. The liquid refrigerant at (505) is then dropped in pressure and evaporated in (504) to produce refrigerant or air conditioning as desired. The vaporized refrigerant is then compressed by compressor (502) to a super heated vapor and returned to the integral water well condenser (501) to complete the cycle.

Depending upon the type of mediums employed in the absorption process, a large number of variations are understood to be included in the component portions. These variations include, for example, where high temperature mixtures such as ammonia and water, where ammonia is the refrigerant, throttle valves are included to reduce pressure. In the ammonia-water system, a throttle valve is located just after the condenser (113) in FIG. 1, to reduce pressure. The well known action of the valve also causes partial evaporation reducing the temperature of the liquid refrigerant entering the evaporator. It is also common practise to employ a valve in the absorbent tube, either at (109), or at (110) to reduce the pressure of the absorbent entering the absorber. In low temperature applications of the preferred embodiment, such as mixtures of lithium bromide and water, where water is the refrigerant, the system is evacuated, lower pressures are utilized, and a flash chamber is used at (113) to reduce the temperature of the water entering the evaporator. The flash chamber is not necessary for the system to operate, but raises the efficiency. Also, in the absorber, in low temperature, lithium bromide and water systems, a low pressure is encountered and the tube (110) is designed with an extended surface and holes for the absorbent to mix properly with the vaporized water refrigerant at (116).

Various embodiments may also include a number and variety of automatic controls, as well known in prior art systems to, turn the systems on and off, divert a portion of the refrigerant or absorbent flow to change the concentration of mixture in accordance with the temperature of the coolant well water, to delay the absorbent flow under start up conditions to allow the refrigerant time to begin the cooling process, and other such improvements well known in the arts. It is also common to include a preheater arrangement between the mixture and absorbent at (107) and (109) to improve efficiency. This is accomplished in some variations by simply having (107) and (109) concentric for a portion of their travel in common.

DESCRIPTION AND CALCULATIONS FOR A PREFERRED BRINE TYPE EMBODIMENT

In a brine type absorption solar air conditioning system in accordance with the present invention, a number of points are useful in the manufacture and use of embodiments hereof. When a salt is employed, which is hygroscopic, having an affinity for water, said water being the refrigerant, the salt to be chosen must show a high affinity for water at low vapor pressures. The reason for the low vapor pressure, is that the pressure must be reduced in the system in order to obtain low temperatures upon flashing and evaporation of the water in the system at the evaporator. Lithium bromide has a high affinity for water at low vapor pressures, and is an excellent choice for use with absorptive brine type embodiments hereof. Engineering details will be given here as helpful in the fabrication hereof and as an exemplary use of the invention. It is to be remembered of course that the invention is not limited to the use of lithium bromide and water only, and the following description is exemplary only.

In a solar application, care must be exercised to obtain the correct concentration of brine. The affinity for water at low vapor pressures is enhanced at very high salt concentration; however, if too much salt is in solution, the system will begin to crystallize and cause blockage of pipes and tubes carrying the brine solution. A concentration is chosen such that it is as high as practical under expected conditions for efficiency. In some models, automatic means may be included to automatically add water to dilute the solution concentration of brine to prevent crystallization. Concentration is easily sensed by a float type specific gravity device, common in the arts and controlled by opening a valve permitting a resorvoir of refrigerant to be added to the solution automatically. With lithium bromide, crystallization will occur at concentrations exceeding 65% by weight at low pressures and at slightly higher concentrations as the vapor pressure is raised. A value of 63% concentration by weight is therefore chosen as an upper limit for the concentration for the brine solution returning from the solar collector or stripper-generator. This, in FIG. 1, is denoted at (109) as the absorbent, and is the recommended concentration at this point in the example embodiment of FIG. 1. The diluted solution will be determined by the system parameters as will be shown.

Water as the refrigerant will boil and flash at low temperatures at very low vapor pressures. With a concentration of 63%, and vapor pressure of 0.18 inch of mercury, an equilibrium temperature of 101° is found for lithium bromide and water. The specific gravity is 1.77 and specific heat is 0.42 BTU/°F lb. (English units employed). As solar heat or other heat is added at the stripper generator, water vapor is expelled, leaving the absorbent at the maximum concentration as just given. The water vapor, is expelled, condensed, giving off heat of vaporization to the well water, returning to the evaporator, where useful heat is removed by again vaporizing the water. For a 6 ton system, for example, 1200 BTU/minute are removed from the evaporator. At a pressure of 0.18 inch of mercury, heat of vaporization is 1072 BTU/lb. The required flow of refrigerant is then seen to be, where M is the mass flow rate of water refrigerant, and assuming 0.18 inch of mercury, also at the evaporator, we have: (33° being sat temp. at 0.18 in hg)

$$M = (1200)/(1072 - 101 + 33) \quad (Eq\ 1)$$

M = 1.2 lbs/min mass flow for 6 ton system.
With a concentration of 63% maximum, a 90° equilibrium temperature will require a minimum concentration of 59%. At 59% concentration, at 0.18 inch of mercury, specific gravity is 1.70 and specific heat is 0.44. The mass flow rate of 1.2 lbs per minute for 6 tons capacity will therefore require the following amount of lithium bromide:

Diluting the 63% solution to 59% requires 63−59 or 4; 4/59 = 6.78% water; absorbent will be 15×1.2 or 18 lb/min. At a spec.grav. of 1.77, and therefore density of 1.77×8.33 or 14.74 lbs per gallon, the flow rate of absorbent (63% conc.) will be 18/14.74 or 1.22 gal/min. The water flow rate will be 1.2/8.33 or 0.14 gal per minute. Both flow rates are very small and tiny pumps only are required, depending upon the water well depth, of course. The flow rate of the diluted solution will be the sum or 1.36 gal/min at spec.grav. of 1.70.

Assuming that the solar collector can produce a temperature of 164° F. at 2 BTU/min per sq ft of surface area, then the vapor pressure will be 1 inch of mercury; and the change in boiling point will be from 148° F. to 164° F. or 16° F. The total heat required will be the heat to raise diluted solution to 148° F. from 90° F., heat to change boiling point, endothermic heat of solution, and heat absorbed in condenser. The heat to raise dilute solution from 90° F. to 148° F. will be, 58×(18+1.2)×0.44 or 490 BTU/min. To change boiling point, we have 16×0.44×(18+0.6) or 131 BTU/min. Endothermic heat of solution will be 1.2×202 or 242 BTU/min. And, at 101°, the condenser will absorb, 1.2×1035 or 1242 BTU/min. The total heat required at the stripper-generator, will be the sum of 490, 131, 242 and 1242 or 2,105 BTU/min. The minimum surface area will be 2,105/2 or 1,053 sq. feet of surface area, for 6 tons, continuous operation, in bright sunlight. The generator ratio is approximately 2,105/1200 or 1.75 which is excellent for a temperature of only 164° in the stripper-generator.

For a well water rise in temperature of 8° F., the amount of coolant will be 2,105/(8×8.33) or 32 gal/min. Actually much less flow is required, since heat will be conducted from the well into the surrounding ground.

It is seen, from reference to FIG. 1, that the vapor pressure at the outlet of the evaporator, and inlet of absorber (115) will be extremely low. Since the entire absorber is sumberged in the well water coolant, the concentration of brine may be maintained close to the crystallization point, for high efficiency. The well will serve to regulate the absorber temperature at a relatively constant value.

To automatically control concentration, an optional float operated valve may be used in brine systems to dilute the absorbent and prevent crystallization with a small reservoir tank of refrigerant filled by condensations from the evaporator of small droplets of refrigerant cooled in the entrance tube (115) to the absorber. Other variations of course are known in the arts to prevent crystallization.

Where it is desired to store cold water or to have a cold water system to operate one or more evaporators at remote locations, the evaporator (114) is a heat exchanger type evaporator with water instead of air as the heat exchange medium, instead of air. The blower assembly (131) and (132) is removed and cold water pipes are used for inlet and outlet to the evaporator, heat exchanger. The cold water requires its separate pump. A slight loss in efficiency will be found from the thermal losses attendant with the extra cycle imposed on the system. However, the cool water may be stored to provide air conditioning at times when no solar or other power is available, and to regulate the operation of the system by providing thermal storage. The chilled water may, in the present invention be maintained at a temperature close to the freezing point of the refrigerant, since the absorber temperature is well regulated at a low value, and hence the vapor pressure at the evaporator may be quite small for equilibrium in the absorber connected by tube (115).

The refrigerant pump (133) is used to overcome the head of the condensed water in the "U" tube (112). The inlet of the evaporator is provided with a throttle (136) valve to prevent any pressure build up. The tubing used to cycle the absorbent is made of materials impervious to corrosion of brine solutions, as well as the mixture pump (106). The system is not controlled by shutting down the pumps. The control is accomplished by removing the heat source or bypassing the mixture flow. It is seen that if excess refrigerant is removed in the stripper-generator, that a brine system will develop excessive concentration and crystallization. Hence, care is taken on start-ups and shut downs to prevent crystallization.

Where it is desired to operate with fuel instead of solar energy, a natural gas, propane, oil or other fuel supply may be used to heat water for a separate hot water cycle for operation of the stripper-generator, or may be used to directly heat the stripper-generator. Under such conditions, much higher temperatures may be achieved, and a wider variation in concentrations of absorbent and mixture may be enjoyed for higher efficiency. A water temperature of approximately 200° F. has been found to be ample with lithium bromide systems in the present invention.

Where higher stripper-generator temperatures are available, due to solar collector with parabolic surfaces, or with fuel fired systems, ammonia water systems become practical with the invention. Such systems use ammonia as the refrigerant, and water as the absorber. Pressures are usually well above atmospheric, and only a single pump is used to apply the mixture (106) to the stripper-generator. Pressure is dropped at the evaporator at (113) by a throttle valve and the pump is removed. The absorbent at (110) is also throttled to reduce pressure.

In general, higher efficiencies are available with the integral water well type embodiments as shown and described, since well water is protected from the heating effect of direct solar radiation. However, where a lake, canal or stream is available, the integral portions of the cooling portions, such as condenser or condenser and absorber may be located under the surface of the available coolant medium. In such cases, the geometry of the condenser or condenser and absorber may be less restrictive, since the narrow guage of most water wells will not be limiting upon the overall dimensions of the structure, and the shape may be other than long and narrow. In such embodiments hereof, means must be provided to prevent damage or loss of equipment from irregularities in the lake, canal, stream or other coolant means from weather, storms, etc., by reason that the water well embodiment hereof provides also a means to hold the equipment in place and to protect the internally located equipment from outside irregularities in weather or environmental conditions.

A preferred brine water embodiment of the type shown in FIG. 1 operates when sufficient solar energy is available for operation. To provide air conditioning at night or at other times when insufficient solar radiation is available, an energy storage device may be employed as well known in the arts. For example, where brine and water are used in the general embodiment of FIG. 1, the lowest possible temperature achieved by evaporation will be just above freezing. Thus, the process of using ice for storage is not directly available, and other means are to be used, such as hot water storage for operation of a stripper generator in the absence of solar radiation. Additional hot water is heated during periods of strong solar radiation and stored in an insulated tank and later used to heat the stripper-generator. Cold water may of course be employed for storage and applied to cool the air passing through the air conditioned area during times of little or no solar radiation.

In an ammonia water type embodiment hereof, ammonia is the refrigerant and temperatures well below the freezing point of water are easily achieved. In such systems an ice chest may be employed to store energy in the form of frozen water during periods of solar radiation. The ice chest or tank is then used to provide very cold water to cool the air passing into the air conditioned area during times of little or no solar radiation.

Energy storage is also accomplished in certain other embodiments hereof by employing parabolic or similarly shaped reflectors to concentrate solar radiation upon the stripper generator. This provides much higher temperatures than with flat type of collectors as shown by example in FIG. 1. Higher operating temperatures permit energy storage by storing heated fluids, such as certain oils which are stable at elevated temperature and have high thermal capacities.

More than one evaporator may be employed in a given system at one time. To operate several evaporators, a manifold is used to connect refrigerant liquid to each evaporator, and another manifold is used to connect all vapor lines of refrigerant from each evaporator back in common to the absorber. In embodiments where freezing temperatures are available, such as in ammonia water systems, one evaporator may be used for food storage and freezing, while others may be used for air conditioning purposes.

This invention lends itself for use with dual cycle systems. For example, a brine water system is used to generate temperatures below atmospheric ambient but above freezing. The evaporator is a heat exchanger for a second cycle, such as a freon compression cycle, which may be used for highly efficient operation of a freezer. Efficiency of the system is very high, since the freon cycle is operated with its condenser, the heat exchanger evaporator at a temperature well below external ambient. Since the invention may have a plural number of evaporators, one evaporator may be employed for condensing service of a freon or other prior art freezer, while other evaporators may be employed for air conditioning purposes. The freon cycle may of course be removed and another absorption cycle be employed, which can achieve freezing temperatures, such as ammonia water cycle.

The solar collector stripper is described as being flat. However, a parabolic shaped collector may be employed to concentrate solar radiation on a limited area to raise the temperature of the stripper-generator process. A higher temperature will increase efficiency of brine systems to about 200° F. In ammonia systems, even higher temperatures are suitable. Where a special oil is used for thermal storage, with a separated heating cycle for the oil, temperatures up to 500° F. have been found possible with special parabolic reflector type collectors. The heated oil may also be withdrawn and used for cooking purposes.

In lieu of the foregoing, it is to remembered that the invention may be practised with a wide variety of different types of apparatus, and may include any number of refinements and variations; and, that the particular embodiments shown and described in the foregoing are exemplary only and not limiting on the broad invention. It is also to be remembered that numerous changes, deletions and additions may be made in the practise hereof without departing from the spirit and scope of the invention.

Whereof, the following claims are made for this invention:

I claim:

1. For use with a cooling liquid reservoir, said reservoir having an inlet connected to a supply of cool liquid for replenishing the reservoir as liquid is removed therefrom; An absorber adapted to be immersed in the cool liquid in said reservoir, said absorber comprising inlet means to permit entry of vaporized refrigerant; inlet means to permit entry of mixture of absorbent and refrigerant; outlet means to permit removal of a mixture of refrigerant and absorbent; a chamber with which said inlet and outlet means communicate, said chamber having thermally conductive walls; means within said chamber for introducing refrigerant into said mixture of absorbent and refrigerant to be absorbed into said mixture; sensing means to sense the temperature of the liquid in said reservoir; and means for withdrawing liquid from said reservoir when the temperature of said liquid rises above a predetermined level, allowing the entry into the reservoir of fresh cool liquid from said supply of cool liquid; said absorber further adapted to be cooled solely by the transfer of heat through said thermally conductive walls into the cool liquid in the reservoir.

2. An air conditioning system comprising a thermal stripper-generator to strip vaporized refrigerant from a liquid mixture of absorbent and refrigerant, means for transferring heat to the thermal stripper-generator, a condenser to liquefy the vaporized refrigerant, an evaporator, an absorber to absorb evaporated refrigerant into the liquid absorbent, conduit means interconnecting the stripper-generator, the condenser, the evaporator and the absorber, an expansion device in the conduit means intermediate to the condenser and the evaporator, a cooling liquid reservoir for cooling said condenser and said absorber, said condenser and said absorber being immersed in said reservoir, said reservoir having an inlet connected to a supply of cool liquid for replenishing the reservoir as liquid is removed therefrom, means for sensing the temperature for the cooling liquid in said reservoir, and means responsive to said temperature-sensing means for withdrawing liquid from said reservoir and replacing said withdrawn liquid with fresh liquid from said supply of cool liquid when the temperature of the liquid in said reservoir rises above a predetermined value.

3. An air conditioning system as in claim 2 wherein said thermal stripper-generator and said heat transfer means are included in an integrated solar collector-stripper.

4. A solar air conditioning system as in claim 3 wherein said reservoir comprises a water well, and said supply of coal liquid comprises the aquifer which feeds said well.

5. A solar air conditioning system as in claim 3 wherein said condenser comprises an elongated tube of thermally conductive material.

6. A solar air conditioning system as in claim 5 wherein said elongated tube is "U"-shaped.

7. A solar air conditioning system as in claim 3 further comprising sealing means to seal said reservoir from the outside atmosphere.

8. A solar air conditioning system including:
(a) A solar collector stripper comprising,
   inlet means to accept a mixture of absorbent and refrigerant,
   solar exposed surface to accept and receive radiant solar energy and convert received radiant solar energy to heat energy,
   means conducting heat energy to mixture of absorbent and refrigerant, to vaporize, strip and separate a portion of refrigerant from the mixture of absorbent and refrigerant, thereby increasing the concentration of remaining mixture of absorbent and refrigerant, and thereby converting heat energy to heat of vaporization,
   outlet means to provide separated refrigerant vapor,
   outlet means to provide concentrated mixture of absorbent and refrigerant,
(b) a water well condenser comprising,
   inlet means to accept vaporized refrigerant,
   an elongated "U" shaped tube to convey refrigerant, submerged beneath the water level of a water well, said tube having a thermally conductive wall to transfer heat of vaporization of refrigerant to the water included within the well, thereby cooling and condensing refrigerant into a liquid state,
   outlet means to provide liquid state refrigerant,
   means sealing inlets and outlets at well head to provide separated water tight passage of well water through the well head to a check valve,
   check valve to permit unidirectional flow of well water,
   pumping means to draw water from well having,
      thermal sensing means to compare well water temperature against a predetermined value,
      control means to turn pumping means on when wall water temperature is higher than said predetermined value, drawing water from well, such that cool water will enter to replace heated water withdrawn,
   means switching pumping means off,
(c) conveyance means to transfer liquid refrigerant to an evaporator,
(d) an evaporator comprising,
   inlet means to accept liquid state refrigerant,
   expansion vessel to vaporize liquid refrigerant, thereby cooling the walls of said expansion vessel having,
      thermally conductive walls, thereby removing heat from warm air forced over the outside surface of thermally conductive walls, thereby converting heat of vaporization of refrigerant to a temperature drop of air forced through system,
   means accepting warm air to be cooled and forcing said warm air over the outside surface of the expansion vessel,
   means providing cooled air for air conditioning purposes of intended space,
   outlet means providing vaporized refrigerant,
(e) a water well absorber comprising:
   inlet means to accept vaporized refrigerant,
   inlet means to accept mixture of increased concentration absorbent and refrigerant,
   elongated mixing structure to admit vaporized refrigerant into increased concentration mixture of absorbent and refrigerant, thereby diluting said mixture, outlet means providing diluted mixture of absorbent and refrigerant, means sealing elongated mixing structure and its inlets and outlet from external well water, said elongated mixing structure located within a water well and submerged below the well water level and having, thermally conductive walls thereby conducting the heat released from the absorption process within to the well water without and heating the well water, means sealing inlets and outlet at the well head to prevent loss of well water and separated water tight passage of well water through the well head, means pumping heated well water from well to admit fresh cool water into the well from the earth, (f) conveyance means to transfer diluted mixture of absorbent and refrigerant from outlet of absorber at well head to inlet of solar collector stripper, (g) conveyance means to transfer vaporized refrigerant from outlet of solar collector stripper to inlet at well head of water well condenser, (h) conveyance means to transfer increased concentration mixture of absorbent and refrigerant at solar collector stripper outlet to inlet of water well absorber, (i) conveyance means to transfer vaporized refrigerant from outlet of evaporator to inlet of water well condenser, (j) means sealing entire system from outside atmosphere, (k) means regulating concentration of absorbent and refrigerant in system, (l) means turning system on and off.

9. A solar air conditioning system similar to claim 8, except that the solar collector stripper of claim 1 is not integral as one unit, but includes:

(a) a solar collector comprising, inlet means to accept a heat transfer medium, cooled by stripper, solar exposed surface to accept and receive radiant solar energy and convert received solar energy to heat energy, means conducting heat energy to heat transfer medium, outlet means to provided heated heat transfer medium, (a') energy storage system comprising, conveyance means to deliver heated heat transfer medium to a thermally insulated vessel from the solar collector, thermally insulated vessel to hold a given volume of heat transfer medium to provide thermal storage of energy, outlet means to deliver stored heated heat transfer medium to a stripper, (a") stripper comprising, inlet means to accept a mixture of absorbent and refrigerant, inlet means to accept heated heat transfer medium, containing vessel to hold mixture of absorbent and refrigerant having, thermal conducting means to conduct heat from heat transfer medium to mixture of absorbent and refrigerant thereby vaporizing a portion of the refrigerant, stripping and separating a portion of the refrigerant and increasing the concentration of absorbent in the remaining mixture of absorbent and refrigerant, outlet means to provide vaporized refrigerant, outlet means to provided concentrated mixture of absorbent and refrigerant, outlet means to provide cooled heat transfer medium, and convey same to solar collector for reheating, means sealing stripper from outside atmosphere and pumping means to provide conveyance of all heat transfer mediums and all fluids and vapors in system.

* * * * *